United States Patent [19]

Kiyohara et al.

[11] 4,086,582
[45] Apr. 25, 1978

[54] EXPOSURE CONTROL DEVICE FOR A CAMERA

[75] Inventors: Takehiko Kiyohara, Zama; Tokuichi Tsunekawa, Yokohama; Mutsunobu Yazaki, Yokohama; Noriaki Sanada, Yokohama; Tetsuya Taguchi, Kawasaki; Zenzo Nakamura, Urawa, all of Japan

[73] Assignee: Canon Kabushiki Kaisha, Tokyo, Japan

[21] Appl. No.: 711,968

[22] Filed: Aug. 5, 1976

[30] Foreign Application Priority Data

Aug. 8, 1975 Japan .................................. 50/96488

[51] Int. Cl.² ............................................ G03B 15/05
[52] U.S. Cl. ........................................ 354/33; 354/34; 354/139; 354/145; 354/149
[58] Field of Search .................. 354/32, 33, 34, 60 F, 354/139, 145, 149

[56] References Cited

U.S. PATENT DOCUMENTS

| | | |
|---|---|---|
| 3,757,654 | 9/1973 | Mori ........................................ 354/33 |
| 3,917,395 | 11/1975 | Ogawa ................................. 354/34 X |
| 3,978,496 | 8/1976 | Matsumoto ........................ 354/34 X |

*Primary Examiner*—L. T. Hix
*Assistant Examiner*—M. L. Gellner
*Attorney, Agent, or Firm*—Toren, McGeady and Stanger

[57] ABSTRACT

An exposure control device in which the output of a light measuring circuit which produces an electrical signal corresponding to the brightness of an object is compared with an output of a level signal circuit which produces an electrical signal of a predetermined level. When the compared value reaches a predetermined value, a flash circuit is made ready to flash, whereby the shutter time is changed over to a predetermined time suited for a flash photography and the flash circuit is made to flash in association with the shutter operation and the shutter is controlled with a constant time.

5 Claims, 3 Drawing Figures

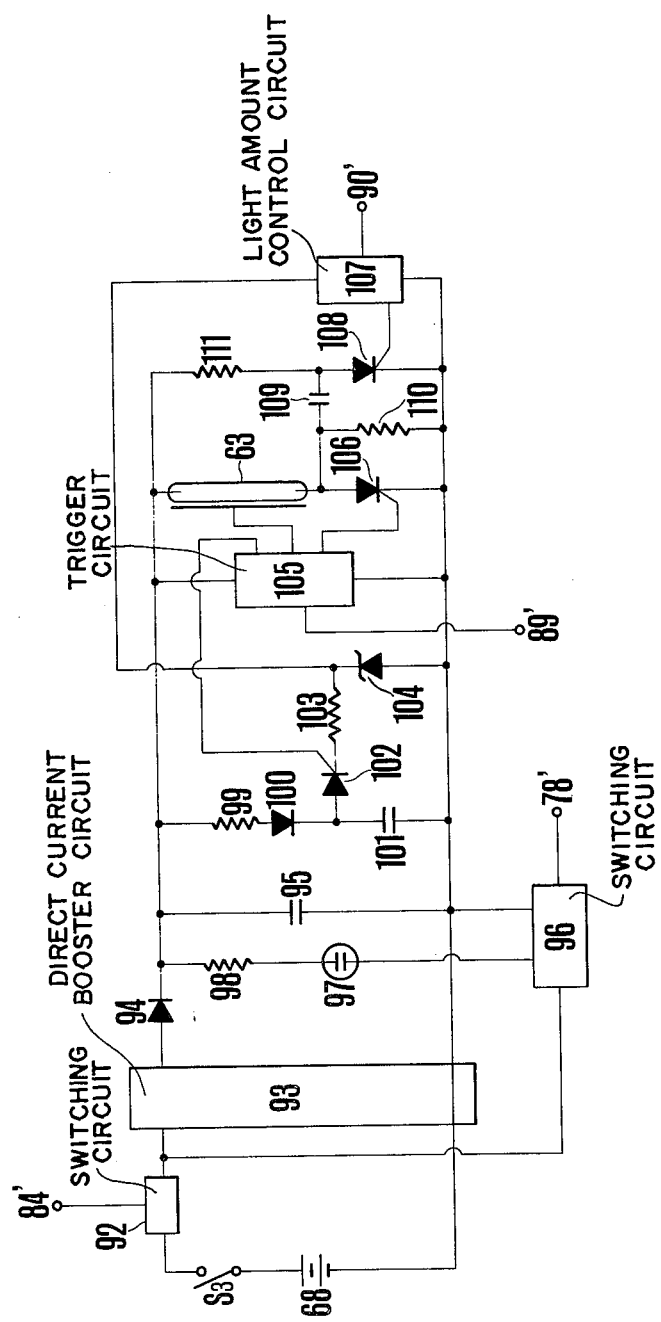
F I G. 3

EXPOSURE CONTROL DEVICE FOR A CAMERA

BACKGROUND OF THE INVENTION

1. Field of the Invention

The present invention relates to an exposure control device of a single lens reflex camera using a small size film cartridge and having a flash device being built therein.

2. Description of the Prior Art

Generally speaking a significant cause of picture quality deterioration in a camera with a small size film is the shaking of a camera. Thus it is desired to make the aperture opening time of a shutter be short. However, to limit longer shutter times would result in limiting the scope of brightness which allows photography against an object brightness, further resulting in a camera with narrow zone of appropriate exposure. Therefore, a camera with a wide exposure zone is desired.

A first object of the present invention is allow to an automatic exposure time control with diaphragm aperture preference in a bright object brightness zone, and at the same time to allow flash photographing automatically in an object brightness zone with shorter shutter time than the prescribed value.

A second object of the present invention is to allow a display within a finder of a change over to flash photographing.

A third object of the present invention is to allow a display within a finder of completion of preparation for flash photographing.

A fourth object of the present invention is to allow a diaphragm aperture preference automatic exposure time control when a flash device fails to be actuated by some trouble even when a flash photographing is to be made.

BRIEF DESCRIPTION OF THE DRAWINGS

FIG. 3 is a flash circuit diagram of a flash device built in a camera shown in FIG. 1.

DESCRIPTION OF THE PREFERRED EMBODIMENTS

Figure 1:
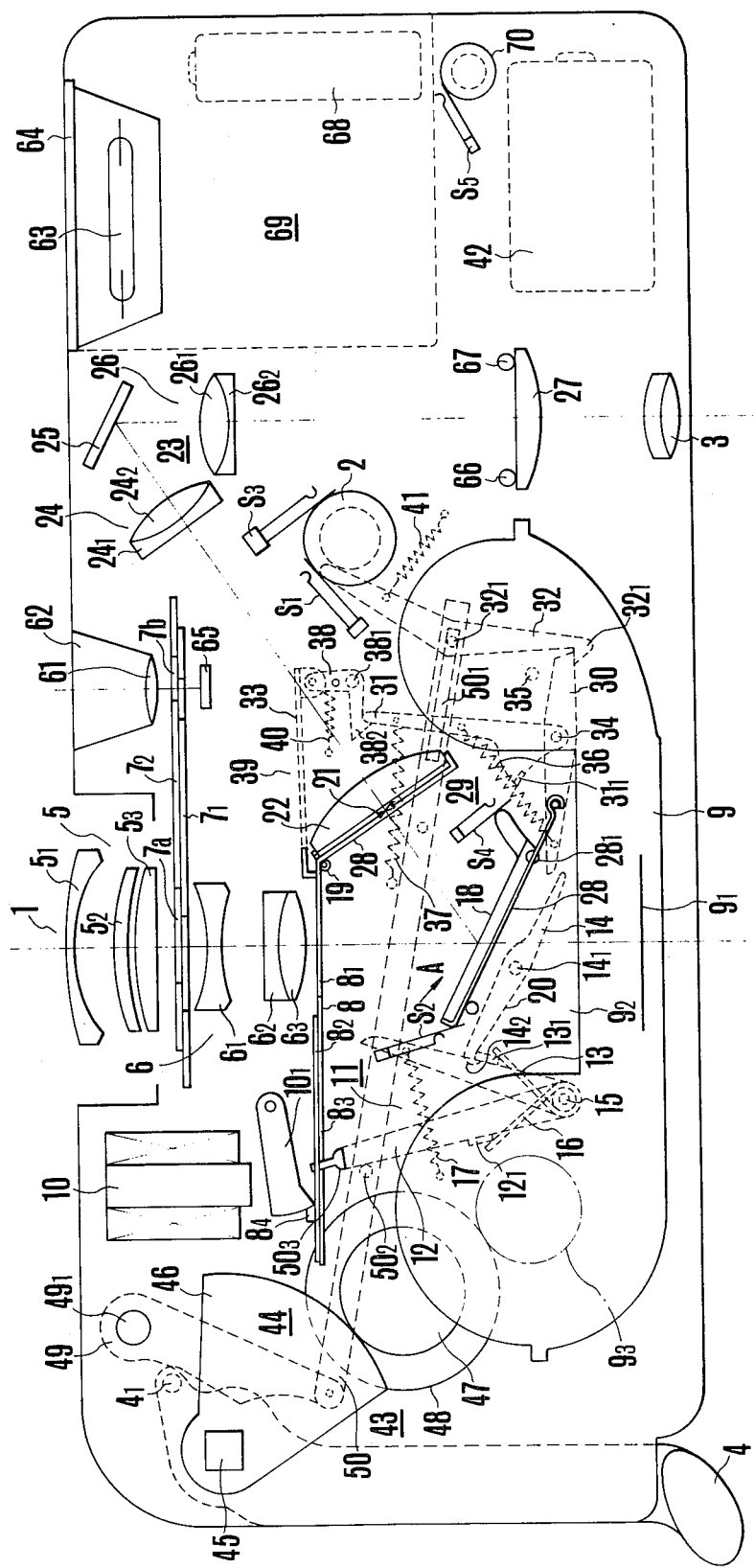
FIG. 1 is an internal set up drawing of a camera main body to show an example of the present invention.

Now, explanations are to be made on an example of the present invention. FIG. 1 shows the internal set up of a camera main body, and a light receiving window 62 having a photographing lens 1 and a light receiving lens 61 provided therein. A flashwindow 64 for a flash tube 63 is provided at a front wall of said camera main body. The photographing lens 1 consists of, for example, a front group comprising a combination of three lenses $5_1$, $5_2$, $5_3$ and a rear group comprising also a combination of three lenses $6_1$, $6_2$, $6_3$, together with a diaphragm $7_1$, $7_2$ intervening between said front group 5 and the rear group 6. Said diaphragm $7_1$, $7_2$ has an aperture part 7a for the photographing lens 1 and an aperture part 7b for the light receiving lens 61, wherein the aperture diameters of said aperture parts 7a, 7b are to vary with same ratio, having film sensitivity taken into account, and the aperture diameters are to be set beforehand. And a light transmitting through the lens 61 is incident into a light receiving element 65 through the aperture part 7b of the light receiving lens 61. A shutter follower screen 8 is placed in the rear of the photographing lens 1, and a small size film cartridge 9 (for example a Kodak 110 cartridge) of indentation shape having its light sensitive plane $9_1$ positioned at an imaging plane of the photographing lens 1 is loaded and positioned in the rear of said lens. Said shutter follower screen 8 consists of a base plate $8_2$ having an aperture part $8_1$ to have the luminous flux from the photographing lens 1 pass therethrough and a sliding screen $8_3$ to slide on said base plate $8_2$ to open and close the aperture part $8_1$. Said sliding screen $8_3$ has a projection part $8_4$ provided at its one end, and a blocking lever $10_1$ is always checked by said projection part $8_4$, so that the aperture part $8_1$ is always kept in an opened state. Said blocking lever $10_1$ is biased to a counter-clockwise direction by a spring, not being shown in the drawing, and has its engagement with the projection part $8_4$ released by attracting action of an electro-magnet 10. And said sliding of the sliding screen $8_3$ on the base plate $8_2$ is to be done by a shutter follower screen actuating mechanism 11, which consists of a closing lever 12, a return lever 13 of the sliding screen $8_3$ and a lever 14 to transmit releasing action of the sliding screen $8_3$. That is, one end of the closing lever 12 having the other end thereof used as an axially supporting part 15 is attached to the sliding screen $8_3$ to enable the sliding screen $8_3$ to slide. Said closing lever 12 is biased to clockwise direction by a spring 16 to always place the sliding screen $8_3$ in a pressed state in a closing direction. And one end of a return lever 13 being biased to counter-clockwise direction by a spring 17 is axially supported at the axially supported part 15 of the closing lever 12. A projection $14_2$ at one end of a transmission lever 14 having its center part formed as an axially supported part $14_1$ is always checked by a projection $13_1$ provided at a center part of said return lever 13. And said transmission lever 14 is biased to a counter-clockwise direction by a spring not being shown in the drawing. Said return lever 13 has the blocking by the projection $14_2$ of the transmission lever 14 released by the rotation of the transmission lever 14 to clockwise direction and rotates to counter-clockwise direction. Also the return lever 13 can press the projection $12_1$ provided at a center part of the closing lever 12 by rotating to a counter-clockwise direction. A rotatable reflex mirror 18, having a light shielding plate not being shown in the drawing provided at its circumference to allow the luminous flux from the photographing lens 1 only to be incident thereinto, is provided at an indentation part $9_2$ of said cartridge 9. Said up rotating action of the mirror 18 is to be made as far as the position of a shock absorbing stopper 19 shown in the drawing consisting of a moltplane. Said mirror 18 is to place the start switch $S_2$ in OFF state by up start action and to place the same in ON state by its return action. Said mirror 18 places the synchronizing contact switch $S_4$ in ON state by its up action completion. Said mirror 18 is obliquely provided always at a position of a stopper 20 shown in the drawing by a spring not shown in the drawing so that it can reflect the luminous flux of the photographing lens 1 as shown in a dot-chain line (B) shown in the drawing. A focal plate 21 and a condenser lens 22 are placed in said order at a position conjugate with the film plane of the cartridge 9 on the reflective direction of the light by said reflex mirror 18. The light transmitting through the condenser lens 22 is reflected in parallel with optical axis (a dot-chain line (A) in the drawing) of the photographing lens 1 by a finder optical system 23 provided at rear of said condenser lens 22 as shown by the dot-chain line 11 shown in the drawing, so that it can be visually seen with an eye-piece 3. Said optical system 23 consists of a front group lens 24 of inverted type, a mirror 25, a rear group lens 26 of inverted type, a condenser lens 27 and an eye-piece 3, wherein positional relationship of these components is as follows. That is, the mirror 25 is obliquely provided at a position to reflect the light transmitting the condenser lens 22 in parallel with the optical axis of the photographing lens 1. The front group lens 24 consisting of a combination of two lenses $24_1$, $24_2$ is provided near an incident side of said mirror 25, and the rear group lens 26 consisting of similarly two lenses $26_1$, $26_2$ is placed near reflecting side of the mirror, while the condenser lens 27 is placed near the incident side of the eye-piece 3. A hand shaking warning element 66 and a display element 67 for flash preparation completion of a flash device are positioned at both ends of said condenser lens 27. And a frame 28 being integral with said reflex mirror 18 is provided at said mirror and a mirror actuating mechanism 29 to conduct up action and return action of the mirror 18 is provided at one end of said frame 28. Said mirror actuating mechanism 29 consists of a mirror up lever 30, a mirror return lever 31, an initiating lever 32, and a locking mechanism 33 for said mirror return lever 31. That is, one end of the frame 28 of the mirror 18 is axially supported at a center part at one end of the mirror up lever 30 which uses its center part as an axial supporting part 34. One end of said mirror up lever 30 is to press a pin $28_1$ provided at the frame 28 at a time of clockwise rotation of the lever 30 to have the mirror 18 conduct up action, so that the transmission lever 14 for releasing the sliding screen $8_3$ of the shutter follower screen 8 is rotated to counter-clockwise direction at a time of counter-clockwise rotation of the lever 30. And the counter-clockwise rotation of the lever 30 is to be blocked at a position of a stopper 35 shown in the drawing. And one end of said mirror return lever 31 is axially supported at the axially supported part 34 of the mirror up lever 30. A spring 36 is spanned between the center part of said mirror return lever 31 and one end of said mirror up lever 30, and the mirror return lever 31 and the mirror up lever 30 are always to pull each other thereby. And a spring 37 to bias the lever 31 always to counter-clockwise direction is provided at said mirror return lever 31. Further, a projection $31_1$ is provided at one end of the mirror return lever 31, and said projection $31_1$ is to press the mirror up lever 30 to counter-clockwise direction at a time of counter-clockwise rotation of the mirror return lever 31. And the other end of the mirror return lever 31 is locked by the locking mechanism 33. Said locking mechanism 33 consists of a locking lever 38 and an actuating lever 39 for the locking lever 38, and said locking lever 38 has its center part used as an axially supporting part $38_1$ and checks the mirror return lever 31 by a projection $38_2$ provided at one end thereof. Said locking lever 38 is biased to counter-clockwise direction by a spring 40 and releases the engagement of the projection $38_2$ and the mirror return lever 31 by the clockwise rotation thereof resisting the spring force. And the other end of the locking lever 38 is attached rotatably at one end of the actuating lever 39. Said actuating lever 39 has the other end thereof movably placed on the base plate $8_1$ of the shutter follower screen 8, so that it can move by the closing action of the sliding plate $8_3$ to rotate the actuating lever 39 to clockwise direction. The other end of said mirror up lever 30 is always checked by a projection $32_2$ provided at one end of the initiating lever 32 having its center part used as an axial supporting part $32_1$. Said initiating lever 32 is biased to clockwise direction by a spring 41, and the engagement between the projection $32_2$ and the mirror up lever 30 is released by the rotation of the lever 32 to counter-clockwise direction. Said initiating lever 32 is rotated to counter-clockwise direction by the pressing action of said shutter button 2. Said shutter button 2 performs a role of placing power source switches $S_1$, $S_3$ of direct current power sources 42, 68 in ON/OFF state besides rotating the initiating lever 32 to counter-clockwise direction, and places the power source switches $S_1$. $S_3$ is ON state by pressing of the same, while it places said power source switches $S_1$, $S_3$ in OFF state by releasing the pressing of the same. And a wind up lever 4 of film is to rotatingly actuate a film wind up mechanism 43 and a shutter charging mechanism 44. That is, a first gear 46 which rotates integrally with the lever 4 is attached to a rotating axle 45 of the film wind up lever 4. A second gear 47 engages itself with said first gear 46. A third gear 48 which rotates integrally is attached to the axle of said second gear 47, and a film wind up gear $9_3$ of the cartridge 9 engages with the third gear 48. And a pin $4_1$ is provided at end part of a rotating axle 45 of the film wind up lever 4, and a side of a transmission bar 49 having an axial supporting part $49_1$ at its one end comes in contact with said pin $4_1$. Said transmission bar 49 is biased to clockwise direction by a spring not shown in the drawing, and rotates to counter-clockwise direction by the rotation of the film wind up lever 4 to clockwise direction. One end of a charge bar 50 is rotatably attached to the other end of said transmission bar 49.

A long hole $50_1$ is perforated at the other end of said charge bar 50, and a supporting axle of the axial supporting part $32_1$ of the initiating lever 32 is freely placed through said long hole. A charging pin $50_2$ of the return lever 13 of the sliding screen $8_3$ and a pin $50_3$ of the mirror return lever 31 are provided at said charge bar 50 being separated from each other by necessary distance. This charge bar 50 can move to a direction of an arrow A in the drawing by the counter-clockwise rotation of the transmission bar 49 to have the return lever 13 of the sliding screen $8_3$ and the mirror return lever 31 engaged with the transmission lever 14 and the locking lever 38 respectively by the pins $50_2$ and $50_3$.

And what is shown as 69 is a flash device having a flash tube 63, and is an automatic light setting speed light device of a series control type. What is shown as 70 is a checker button and a switch $S_5$ is placed in ON state by pressing of the button 70.

Figure 2:
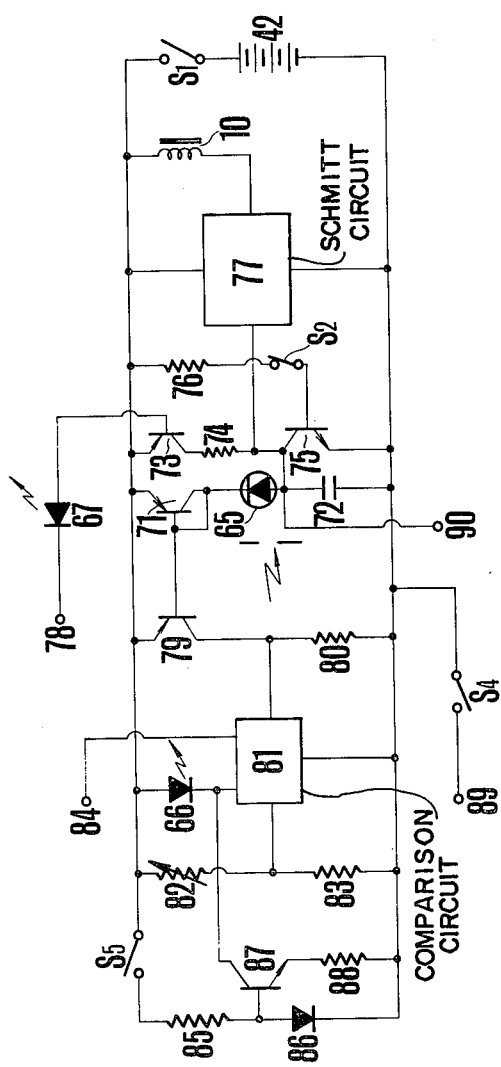
FIG. 2 is an exposure control circuit diagram of a camera shown in FIG. 1.

Now, FIG. 2 is to show an exposure control circuit of a camera shown in FIG. 1, wherein what is shown as 42 is a power source battery, while $S_1$ is a power source switch. This battery 42 has a transistor 71, a light receiving element 65 of for example a silicon photo-cell, etc., and a capacitor 72 connected in series and has a transistor 73, a resistance 74, and a transistor 75 connected in series. A start switch $S_2$ and a resistance 76 are connected in series to the base of the transistor 75, and the collector thereof is connected between the light receiving element 65 and the capacitor 72. Therefore, when the switch $S_2$ is placed in OFF state, the transistor 75 is placed in OFF state and photo-current of the light receiving element 65 is charged at the capacitor 72. What is shown at 77 is a Schmidt circuit, which becomes ON as the charging voltage of the capacitor 72 reaches a prescribed level to flow magnetizing current to the electromagnet 10. The base of the transistor 73 is connected to a terminal 78 through a display element 67 for flash preparation completion. When the flash preparation completion signal from the flash device 69 is added to said terminal 78, the transistor 73 becomes ON and the capacitor 72 is charged through the resistance 74. Also the photo-current of the light receiving element 65 is compressed by the transistor 71 and is expanded by the transistor 79 having its base connected with that of the transistor 71, then flows to the resistance 80. Therefore, such voltage as corresponding to the capacitor 72 is generated at both ends of the resistance 80 and said voltage is inputted into the comparison circuit 81 Divided voltages of a manual shutter time setting variable resistance 82 and of a resistance 83 are to be inputted into the comparison circuit 81, and when both inputted voltage are equal the comparison circuit 81 makes the hand shaking warning display element 66 to emit light and at the same gives actuating signal of a flash device to the terminal 84. And a resistance 85 and a diode 86 are connected in series through the checker switch $S_5$ between terminals of the power source 42 and the connecting point between said resistance 85 and the diode 86 is connected to the base of the transistor 87. And a resistance 88 is connected to the emitter of said transistor 87, while the collector of the same is connected between the display element 66 and a comparator 81. What is shown as $S_4$ is a synchronizing contact switch and becomes ON to give a flash staring signal to a terminal 89. What is shown as 90 is a terminal to give a flash stop signal to a flash device and this terminal 90 is connected between the capacitor 72 and the light receiving element 65.

FIG. 3 is to show a flash circuit of the flash device 69 shown in FIG. 1, and in FIG. 3, what is shown as 68 is a power source battery and said battery 68 has a transistor direct current booster circuit 93 connected thereto through a power source switch $S_3$ and a switching circuit 92. When a flash circuit actuating signal is given to the terminal 84' the switching circuit 92 becomes ON to charge the capacitors 95, 101, 109 to be described later. And the output terminal of the booster circuit 93 has a main capacitor 95 connected thereto through the diode 94. What is shown as 96 is a switching circuit, and when the charged voltage of a main capacitor 95 reaches such prescribed value as allowing the flash tube 63 to emit light the switching circuit 96 becomes ON to give a flash preparation completion signal to a terminal 78', and at the same time a neon lamp 97 has current flown thereto through a resistance 98 and is lighted. A series circuit consisting of a resistance 99, a diode 100, and a capacitor 101 is connected in parallel with the main capacitor 95, and a series circuit consisting of a thyristor 102, a resistance 103 and a zener diode 104 is connected in parallel with said capacitor 101. What is shown as 105 is a trigger circuit, and when a flash starting signal is given thereto through the terminal 89', said circuit triggers the flash tube 63 and gives gate signal to a thyristor 106 connected in series to the flash tube 63 and to said thyristor 102 to make them ON. What is shown as 107 is a light amount control circuit and is placed in an actuated state as the voltage of the zener diode 104 is impressed for a period of a few milli-seconds. When a flash stop signal is given to said light amount control circuit 107 through a terminal 91', the light amount control circuit 107 gives gate signal to a thyristor 108 to make it ON. What is shown as 109 is a capacitor, and when the thyristor 108 is made ON said capacitor 109 makes such discharge as being reverse to the thyristor 106 to place the thyrister 106 in OFF state. What are shown as 110 and 111 are resistances.

Now explanations will be made on the function of the above mentioned set up. First explanations will be made on a case when an automatic exposure time control with diaphragm aperture preference is made for ordinary photographing. In a normal state wherein the shutter button 2 is not pressed, that is a state shown in the drawing, the luminous flux from the photographing lens 1 is after being reflected by the reflex mirror 18, as shown by the dot-chain line shown in Z-letter shape in the drawing, proceeds through the focal plate 21, the condensor lens 22 and the front group lens 24 in said order and is reflected again by the mirror 25, then it proceeds through the rear group lens 26 and the condensor lens 27 in said order and reaches the eye-piece 3, thus it will be visually seen by a photographer. When the shutter button 2 is pressed under this state the power source switches $S_1$ and $S_3$ are made ON and the initiating lever 32 rotates to counter-clockwise direction. At this time while the power source is put into the flash circuit the actuating signal for the flash circuit is not given to the flash circuit, thus said circuit will not function. By the rotation of the initiating lever 32 the engagement between the projection $32_2$ of the initiating lever 32 and the mirror up lever 30 is released, and the mirror up lever 30 is rotated to clockwise direction by the spring 36. By this one end of the mirror up lever 30 pushes the pin 28 of the reflex mirror 18. Therefore, the mirror 18 makes rotating action and stops at a position of the shock absorbing stopper 19. By the up action of said mirror 18, the luminous flux from the photographing lens 1 will not be reflected by the mirror 18 to start exposure at the film photosensitive plane $9_1$ of the cartridge 9. Also, a start switch is made OFF by the starting of the up action of the mirror 18. Therefore, the exposure control circuit has such period of time elapsed as corresponding to the output of the light receiving element 65 to receive object light through the light receiving lens 61 and the aperture part $7b$ of the diaphragm being set beforehand to actuate the electromagnet 10. Since the blocking lever $10_1$ is atracted by the electro-magnet 10 thereby, the engagement between the blocking lever $10_1$ and the projection $8_4$ of the sliding screen $8_3$ is released. Therefore the sliding screen $8_3$ is slided by the closing lever 12 to close the aperture part $8_1$ of the base plate $8_2$. By said closing action the exposure of the film photosensitive plane $9_1$ of the cartridge 9 by the luminous flux by the photographing lens 1 is completed and at the same time the forward end of the sliding screen $8_3$ presses the actuating lever 39 of the locking mechanism 33. Therefore, the locking lever 38 rotates to clockwise direction to release the engagement with the mirror return lever 31. By this, the return lever 31 rotates to counter-clockwise direction by the spring 37. At the same time the mirror up lever 30 is also pressed by the projection $31_1$ of the return lever 31 and rotates to counter-clockwise direction as far as a position of the stopper 35. By this the reflex mirror 18 rotates by a spring to counter-clockwise direction as far as the position of the stopper 20 in such manner as following to the mirror up lever 30 to resume the original position. The start switch $S_2$ is made ON by the return action of said mirror 18, thereby the electro-magnet 10 will not be actuated, therefore the blocking lever $10_1$ comes down onto the base plate $8_2$ of the shutter follower screen 8. Also, when the rotation of the mirror up lever 30 is completed, one end of the mirror up lever 30 presses the other end of the release action transmission lever 14 of the sliding screen 8₃. Therefore, the transmission lever 14 rotates to clockwise direction to release the checking of the return lever 13 for sliding screen 8₃. Therefore, the return lever 13 rotates to counter-clockwise direction by the spring 17. At the same time the closing lever 12 has its projection 12₁ pressed against the side of the return lever 13 and rotates to counter-clockwise direction. Therefore, the sliding screen 8₃ slides to open the aperture part 8₁ of the base plate 8₂ and at the same time the projection 8₄ of the sliding screen 8₃ is checked by the blocking lever 10₁. Since the aperture part 8₁ of the base plate 8₂ is opened as mentioned above, the luminous flux of the photographing lens 1 proceeds again along the optical path of the dot-chain line shown in the drawing and will be seen visually by the eye-piece 3. And when the pressing of the shutter button 2 is released under this state, the initiating lever 32 returns to a state to check the mirror up lever 30 as shown in the drawing. And when the film wind up lever 4 is rotated to clockwise direction, the film take up gear 9₃ rotates to clockwise direction by the first, second and third gears 46, 47, 48 to conduct fixed length feeding of film in the cartridge 9. Since the transmission bar 49 is rotated to counter-clockwise direction at the same time, the charge bar 50 moves to the direction of arrow A shown in the drawing. Therefore the pins 50₂ and 50₃ of the charge bar 50 rotate the return lever 13 of the sliding screen 8₃ and the mirror return lever 31 respectively to counter-clockwise direction. Thereby the return lever 13 of the sliding screen 8₃ is checked by the transmission lever 14 and the mirror return lever 31 is checked by the locking lever 38. By this the charging of the shutter is completed. After this, when the film wind up lever is rotated to counter-clockwise direction to return it to the state shown in the drawing, the charge bar moves to a direction reverse to the direction of arrow A shown in the drawing to return to its original position. Now every part is returned to the state shown in the drawing so that it is prepared for next shutter action.

Next explanations will be made on a case when a flash photographing is done. When the shutter button 2 is pressed the power source switches S₁ and S₃ become ON. Therefore, the light receiving element 65 generates such photo-current as corresponding to an object light passing through the predetermined aperture part 7b of the diaphragm. Said photo-current is compressed by flowing between the emitter and the collector of the transistor 71, and said compressed photo-current is expanded by the transistor 79 and flows to the resistance 80. Such voltage as corresponding to a time constant capacitor 72 is generated at both ends of said resistance 80 and said voltage is given to one of the inputs of the comparison circuit 81. And divided voltages of the manual shutter time setting resistance 82 and the resistance 83 are added to the other input of said comparison circuit 81, and the comparison circuit 81 compares both input voltages and as the difference between said both input voltages reaches a prescribed value, it gives voltage to the hand shaking warning display element 66 to make a display of hand shaking warning within a finder and at the same time gives flash circuit actuating signal to the flash circuit through the terminals 84 and 84'. When the actuating signal is added to the flash circuit, the switching circuit 92 becomes ON and the power source voltage is boosted by the booster circuit 93, and the main capacitor 95 and the capacitors 101, 109 are charged by direct current rectified by the diode 94. When the charged voltage of the main capacitor 95 reaches such level as enabling the flash tube 63 to emit light, the neon lamps 97 is lighted to place the switching circuit 96 in ON state. When said switching circuit 96 becomes ON, the flash preparation completion signal is added to the exposure control circuit through the terminals 78 and 78'. Therefore, as the flash preparation completion display element emits light to display the flash preparation completion within the finder and at the same time the switching transistor 73 of the time constant circuit becomes ON, such constant time as not depending on object brightness is set by the time constant circuit consisting of the resistance 74 and the capacitor 72. And when the shutter button 2 is pressed further upon confirming the flash preparation completion display, the start switch S₂ becomes OFF by the start of the mirror up action as mentioned above, and the charging of the capacitor 72 is started. And the synchronizing contact switch S₄ is placed in ON state at a moment when the mirror as a shutter leading screen is opened, the flash starting signals is added to the flash circuit through the terminals 89 and 89'. Therefore, as the trigger circuit 105 is triggered the thyristers 102, 106 are made ON and at the same time the flash tube 63 emitts light. As the thyrister 102 becomes ON, the electric charge of the capacitor 101 is impressed on the Zener diode 104 and its voltage is impressed on the light amount control circuit 107 for a period of a few milli seconds. On the other hand, the light reflected from an object by the luminescence of the flash tube 63 is received by the light receiving element 65 and its output is added to the light amount control circuit 107 of the flash circuit through the terminals 90, 90' as the flash stop signal, and as it reaches a prescribed level, the level detection circuit part of the light amount control circuit detects the same to add gate signal to the thyrister 108. At said thyrister 108 is made ON, the discharging current of the capacitor 109 flows in a direction reverse to the thyrister 106 to make the thyrister 106 OFF. By this, the luminescence of the flash tube 63 is stopped. And since the time constant circuit has a constant time by said flash preparation completion signal, the capacitor 72 reaches a prescribed level after a predetermined period of time, and the Schmidt circuit 77 becomes ON to magnetize the electromagnet 10. After that function as mentioned above will be made thus exposure will be completed.

Also, when flash preparation completion state can not be obtained by failure in a portion of the flash circuit, or when the shutter button 2 is further pressed to initiate the shutter before the flash preparation completion state is reached, the flash preparation completion signal is not added to the exposure control circuit from the flash circuit, therefore, even if the exposure control circuit makes hand shaking warning, such period of time as corresponding to the output of the light receiving element 65 in proportionate with object brightness at that time is made to elapse to place the electro-magnet 10 in an activated state, thus appropriate exposure will be done. Also as the checker button uO is pressed, the switch S₅ becomes ON thereby the voltage check of the power source 42 can be displayed within the finder utilizing the hand shaking warming display element 66.

As has been explained above in detail according to the present invention a flash device is built in a camera main body to conduct automatic exposure time control with diaphragm aperture preference in a bright object brightness zone, and to conduct a hand shaking warning display within a finder in a comparatively dask object brightness zone under slower time zone than a prescribed shutter time, so that automatic flash photographing is done, thus the zone to allow photographing can be widened. Also, while it takes time from the flash circuit is activated until the flash preparation completion state is obtained, when the shutter button is pressed down before the flash preparation is completed to activate the shutter, or when the flash circuit does not function by some trouble and the flash preparation completion is not reached yet the shutter is activated, while there may be possibility of hand shaking, automatic exposure control with diaphragm preference is done, thus photographing with appropriate exposure can be done.

Further, since the output of the light receiving celement of the exposure control circuit is made to be added to the flash circuit also, the number of light receiving elements can be reduced and the circuit may be simplified.

What is claimed is:

1. An exposure control device of a camera comprising:
   light measuring means to measure object brightness and for generating an electric signal corresponding to an object brightness;
   level signal generation means for generating an electrical signal with a preset level;
   comparison means to compare the signal output of said light measuring means and the signal output of the level signal generation means, wherein said comparison means provides an electrical signal when the difference between said signal output values reaches a prescribed value;
   flash emitting means for making flash light emission;
   flash action preparation means for making flash action preparation of said flash light emitting means, wherein said preparation means starts the light emission preparation by the output signal of said comparison means and generates an electrical signal upon completion of the light emission preparation;
   exposure time control means, which has a first time forming means being normally operable and a second time forming means becoming operable by the signal output of said flash action preparation means, wherein said first time forming means conducts such exposure time control as corresponding to the signal output of the light measuring means while the second time forming means conducts exposure time control with a predetermined time, and
   a shutter having its opening time controlled by one out of the first time forming means and the second time forming means, wherein said shutter is activated in an association with the release action, whereby flashing action of the flash light emitting means is made.

2. An exposure control device of a camera according to claim 1, which has a second time forming means switching means and wherein an exposure time control with a predetermined time is performed when said switching means is changed over by the signal output of the flash action preparation means.

3. An exposure control device of a camera according to claim 1, which further ecomprises:
   light amount detection means to which the signal output of said light measuring means which receives the flash of the flash light emission means as it emits light is added, wherein said detection means generates an electric signal when it detects a prescribed amount of light, and
   a flash stop means to stop flashing of said flash light emission means, wherein said stop means is activated by the signal output from the light amount detection means.

4. An exposure control device of a camera according to claim 1, which further comprises a "hand shaking" warning display means which conducts display action by the signal output of said comparison means.

5. An exposure control device of a camera according to claim 1, which further comprises a flash preparation completion display means, which conducts a display action by the signal output of said flash action preparation means.

* * * * *